United States Patent
Raye et al.

(10) Patent No.: US 9,829,121 B2
(45) Date of Patent: Nov. 28, 2017

(54) MANIFOLD SYSTEM

(75) Inventors: Victor J. Raye, Kansas City, MO (US); Jerry J. Donovan, Shawnee, KS (US)

(73) Assignee: Haldex Brake Products Corporation, Kansas City, MO (US)

( * ) Notice: Subject to any disclaimer, the term of this patent is extended or adjusted under 35 U.S.C. 154(b) by 1015 days.

(21) Appl. No.: 12/730,923

(22) Filed: Mar. 24, 2010

(65) Prior Publication Data

US 2011/0236128 A1    Sep. 29, 2011

(51) Int. Cl.
    *F16L 5/14*    (2006.01)
    *F16B 2/06*    (2006.01)

(52) U.S. Cl.
    CPC ............... *F16L 5/14* (2013.01); *F16B 2/065* (2013.01); *Y10T 403/75* (2015.01)

(58) Field of Classification Search
    CPC ..... F16L 3/006; F16L 3/02; F16L 3/22; F16L 3/20; F16L 5/14; Y10T 137/6892; Y10T 137/6851; Y10T 137/87885; Y10T 137/6855; Y10T 137/5109; Y10T 137/5283; Y10T 403/75
    USPC ..... 285/24, 124.3, 124.5, 142.1, 140.1, 209, 285/61, 62, 63, 124.4, 124.2; 248/222.14, 248/223.21; 137/883, 356
    See application file for complete search history.

(56) References Cited

U.S. PATENT DOCUMENTS

| 2,069,238 | A | * | 2/1937 | Fraser ............................ 362/549 |
| 2,763,419 | A | * | 9/1956 | Brown et al. .................... 141/94 |
| 3,232,568 | A | * | 2/1966 | Lennon .................... F16K 27/00 137/343 |
| 3,728,470 | A | * | 4/1973 | Maier ............................. 174/58 |
| 3,869,152 | A | * | 3/1975 | DeVincent et al. ........ 285/124.3 |
| 4,913,189 | A | * | 4/1990 | Kline ................. B60H 1/00642 137/560 |
| 4,915,419 | A | * | 4/1990 | Smith, III ....................... 285/26 |
| 5,046,786 | A | | 9/1991 | Johnston et al. |
| 5,372,392 | A | * | 12/1994 | Dunn et al. ................ 285/334.1 |
| 5,725,255 | A | * | 3/1998 | Hayashi .................. F16L 39/00 137/625.64 |
| 6,264,286 | B1 | | 7/2001 | Ehrlich et al. |
| 6,866,300 | B2 | * | 3/2005 | Hayes et al. ............... 285/124.2 |
| 7,207,602 | B2 | * | 4/2007 | Burian et al. ................... 285/24 |
| 8,973,615 | B2 | * | 3/2015 | Hoshi ................... F16K 27/003 137/884 |
| 2003/0019649 | A1 | * | 1/2003 | Rubenstein et al. ........ 174/65 R |

* cited by examiner

Primary Examiner — David E Bochna
Assistant Examiner — James A Linford
(74) Attorney, Agent, or Firm — St. Onge Steward Johnston & Reens, LLC

(57) ABSTRACT

A system module, manifold system and method for installing and/or attaching a manifold system to a trailer/dolly system module. The manifold system includes groove and at least one fastener for securing the manifold system to the system module.

8 Claims, 6 Drawing Sheets

MANIFOLD SYSTEM

CROSS-REFERENCE TO RELATED APPLICATIONS

This application is related to U.S. patent application Ser. No. 12/392,819, the contents of which are incorporated by reference.

FIELD OF THE INVENTION

The present invention relates to a system module and manifold system that are easily removable and mounted to a trailer vehicle.

BACKGROUND OF THE INVENTION

Tractor-Trailer and/or dolly vehicles are used to transport large quantities of cargo across the United States. Various industries and consumers are dependent upon these trailer/dolly vehicles for the transport of their goods. In particular, the shipping industry, including large companies such as UPS®, FedEx®, and the United States Postal Service® among others, utilize trailer/dolly vehicles to transport and ship goods to consumers. These vehicles help the shipping industry adequately transport goods in order to meet the demand of US consumers, which require huge volumes of goods to be shipped daily.

What makes trailer/dolly vehicles unique is that these vehicles are constantly being used and operated. Companies try to maximize use of trailer/dolly vehicles, as this allows companies to fully allocate their resources and limit costs. In fact, companies work under the operational model whereby trailer/dolly vehicles are in constant use. This saves the industry thousands, if not millions, of dollars in operational savings.

Inevitably, however, trailer/dolly vehicles must be serviced, which results in trailer/dolly downtime. Servicing trailer/dolly vehicles disrupts the operational model of shipping companies, and results in monetary and operational losses, as shipping companies cannot maximize the efficiency of their trailer/dolly vehicles. These companies, which still must meet consumer demand, then need to compensate for servicing delays by purchasing additional trailer/dolly vehicles or by renting additional trailer/dolly vehicles from another company. In both instances, these inefficiencies due to trailer/dolly downtime costs companies time and money.

Thus, it is desirable to avoid such trailer/dolly vehicle downtime, especially periodic causes of downtime for these vehicles. One such periodic cause of trailer/dolly downtime could be the failure of an Anti-Lock Brake (ABS) module. Other such periodic causes of trailer/dolly downtime could be the failure of the Booster Valve, the Pressure Protection Valve, or any other such valve in the trailer/dolly, as well as the trailer/dolly control and hydraulic systems. These components are typically located mounted on a manifold system, which is located within the system module that is attached to the trailer/dolly vehicle.

It is thus desirable to reduce, if not limit entirely, the amount of trailer/dolly vehicle downtime because of downtime due to the trailer/dolly system module or manifold system.

Prior art designs of such system modules and manifold system attached to system modules required the entire trailer/dolly vehicle to be inoperable if a problem within the system module or manifold system occurred. Thus, when the system module or manifold system located within the system module had to be replaced, the entire trailer/dolly vehicle would be inoperable and could not be used, resulting in the delays and inefficiencies described above. Furthermore, prior art designs of system modules and manifold systems for trailer/dolly systems have greater failure rates as these prior art designs are difficult to access and fix, because these system modules containing manifold systems are not easily removable.

What is thus desired, therefore, is an apparatus and method for providing a system module and manifold system that may be easily removable and replaced, so that trailer/dolly vehicle downtime is minimized. What is further desired is a system module and manifold system that may be easily removed, so that if a problem is detected in the system module or manifold system, the system module and/or manifold system may be quickly replaced with another system module and/or manifold system, allowing for continued use of the trailer/dolly vehicle and minimizing downtime.

What is further desired is for the manifold system to be easily installed and adaptable with a system module, the system module being attached to a trailer/dolly vehicle. What is further desired is that the manifold system may be inserted into a slot within a trailer/dolly system module and may be slidable within this slot. It is further desired for the manifold system to be attached or secured to the system module by using fasteners.

What is further desired is for the manifold system to use multiple passage ways internal to the manifold system that minimize fittings and connections and simplify plumbing with other components on the system module in order to reduce leakage points and speed up assembly time. Furthermore, it is desired for the manifold system to connect various valves to one another within a system module and for the manifold system to use a boot to protect certain valve components from contamination.

SUMMARY OF THE INVENTION

Accordingly, it is an object of the present invention to provide an apparatus and method for providing a manifold system that can be easily removed and replaced to minimize trailer/dolly downtime.

It is a further object of the present invention to provide a manifold system that may be easily removed, so that if a problem is detected in the manifold system, the manifold system may be quickly replaced with another manifold system, allowing for continued use of the trailer/dolly vehicle.

It is a further object of the present invention for the manifold system to be easily installed and to be adaptable with the system module, so that the manifold system may be used by the system module.

It is a further object for the manifold system to be inserted into a slot within the system module and to be slidable within this slot. It is a further object of the present invention for the manifold system to be attached or secured to the system module by using fasteners.

It is a further object for the manifold system to use multiple passage ways internal to the manifold system that minimize fittings and connections and simplify plumbing with other components on the system module.

It is a further object of the invention for the manifold system to reduce leakage points and speed up assembly/installation time of the system module. It is a further object of the invention to eliminate installation error of the manifold system, thus minimizing operation cost in both early and unnecessary repair and replacement cost, as well as minimizing catastrophic failures, which results in insurance cost saving. It is a further object of the invention for the manifold system to reduce diagnostic and repair time compared to prior art manifold system designs.

It is a further object of the present invention for the manifold system to connect various valves to one another within a system module. It is a further object of the invention for the manifold system to use a boot to protect certain valve components from contamination, such as Road Salt, Sand, Dirt, Moisture, and Mag-Chloride.

It is a further object of the present invention for the manifold system to be made out of Plastic, Steel, Aluminum, Composite, or a Casting.

These and other objectives are achieved by providing a manifold system for a trailer system module comprising: a body having at least one mounting hole and at least one groove for attachment to the trailer system module, and at least one fastening element, wherein upon attachment of the manifold system to the trailer system module, the at least one groove is fitted to an attachment element of the trailer system module and the at least one fastening element fastens the body to the attachment element via the at least one mounting hole.

The manifold system may be removable from the trailer system module by removing the at least one fastening element. The manifold system also may be detached from the trailer system module and may be repaired without disturbing the continued use of a trailer vehicle.

The manifold system may be replaced by a second manifold system. Additionally, the attachment element on the trailer system module may be a slot for supporting the manifold system, the manifold system fitting into said slot.

The manifold system may be made from a group of materials consisting of aluminum, casting, engineering plastics, metal, steel, or a combination thereof. The manifold system may have two grooves and may further have at least one valve and/or fitting.

The manifold system may further have multiple passageways internal to the manifold system that minimize fittings, connections and/or simplify plumbing of the trailer system module. Optionally, the manifold system may further have a boot to protect said manifold system from contamination.

Other objectives of the invention are met by providing a method for installing a manifold system on a trailer system module comprising: introducing the manifold system; introducing a mounting element on the trailer system module; attaching the manifold system to said mounting element; and fastening the manifold system to said mounting element via external fasteners.

The method may have the mounting element described in the method further comprise a slot, wherein the manifold system slides into said slot.

The method may further comprise the steps of unfastening said external fasteners; removing the manifold system from said mounting element; attaching a second manifold system to said mounting element; and fastening the second manifold system to said mounting element via said external fasteners.

The manifold system in the method may further comprise at least one valve and the method may further comprise the step of attaching the at least one valve of the manifold system to plumbing in the system module.

Other objectives of the invention are met by providing a trailer system comprising: a trailer system module having a mounting surface, a manifold system, and at least one mounting element, wherein said at least one mounting element attaches said manifold system to said trailer system module at said mounting surface.

The mounting surface may be located within a trailer vehicle. The manifold system may also be removable from the mounting surface.

Additionally, the trailer system may further comprise at least one fastening element allowing for the manifold system to be fastened to the mounting surface.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1:
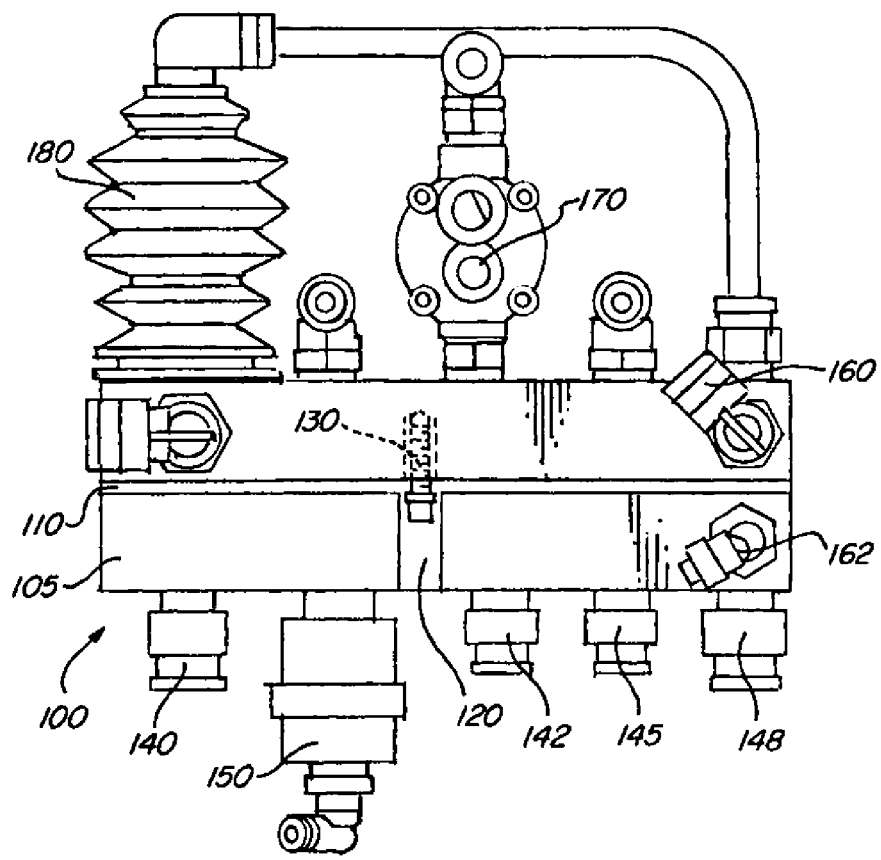
FIG. 1 is a top perspective view of an embodiment of the invention.

FIG. 1 shows manifold system 100 with body 105 having groove 110 and mounting hole 120. Screw 130 is shown in phantom illustrating that it may be screwed through mounting hole 120. Screw 130 is an example of a fastener or fastening means that allows manifold system 100 to be secured to a system module. While only one screw and one mounting hole is shown in FIG. 1, this is not meant to limit the amount of screws (fasteners) and/or mounting holes present for this invention. Additionally, while only 1 groove is shown, additional grooves, such as the lower groove shown in FIGS. 2 and 5, and even a third, fourth, or fifth groove, may also be included to secure manifold system 100 to a system module. These groove(s) or plurality of grooves allow manifold system 100 to be slidable and allow manifold system 100 to engage the attachment element (shown as a panel in FIGS. 4-6) of the system module.

FIG. 1 also shows various components of manifold system 100 such as straight fitting(s) 140, 142, 145 and 148, one way check valve 150, ninety degree fitting(s) 160 and 162, pressure protection valve 170, and pressure protection valve with boot 180. These elements can interact with various connections on the system module allowing for minimizing fittings and connections and simplifying plumbing with other components on the system module in order to reduce leakage points and speed up assembly time. The connections of the valves and fittings to elements in the system module are not shown.

Figure 2:
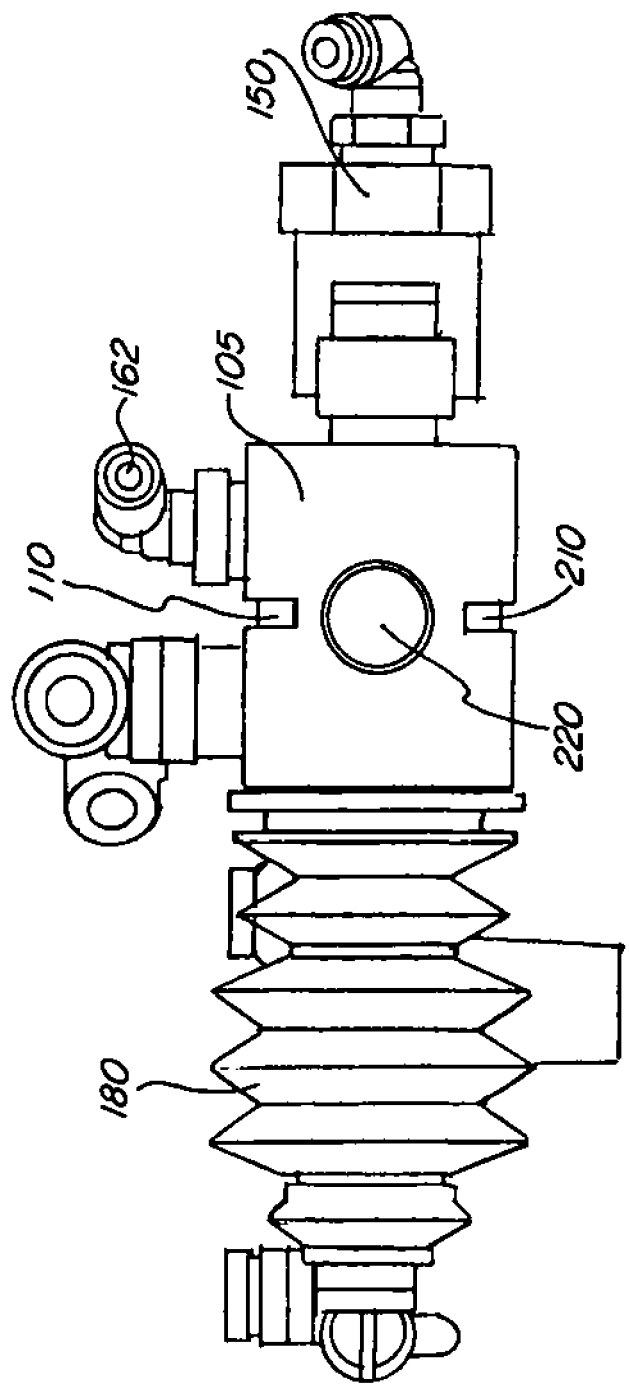
FIG. 2 is a end perspective view of the embodiment shown in FIG. 1.

FIG. 2 shows an end view of manifold system 100 shown in FIG. 1. Here, groove 110 and lower groove 210 are shown located on body 105 of manifold system 100. One way check valve 150, pressure protection valve with boot 180, ninety degree fitting 162, and pipe plug 220 are also shown in this view. These elements may connect to various connections on the system module.

Figure 3:
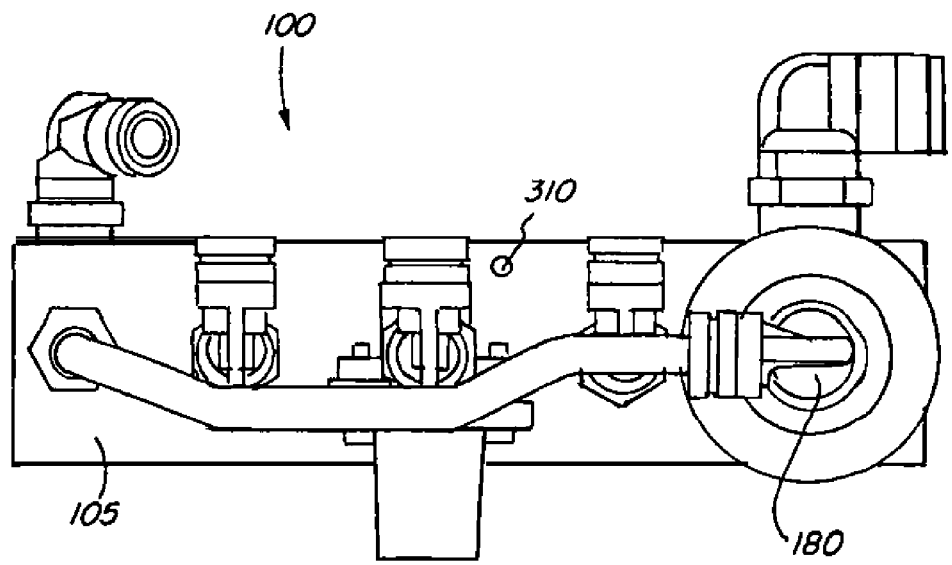
FIG. 3 is a rear perspective view of the embodiment shown in FIG. 1.

FIG. 3 is a rear view of manifold system 100 with body 105 showing mounting hole 310, which allows for fasteners, such as screws (not shown) to secure manifold system 100 to system module 400 (not shown).

Figure 4:
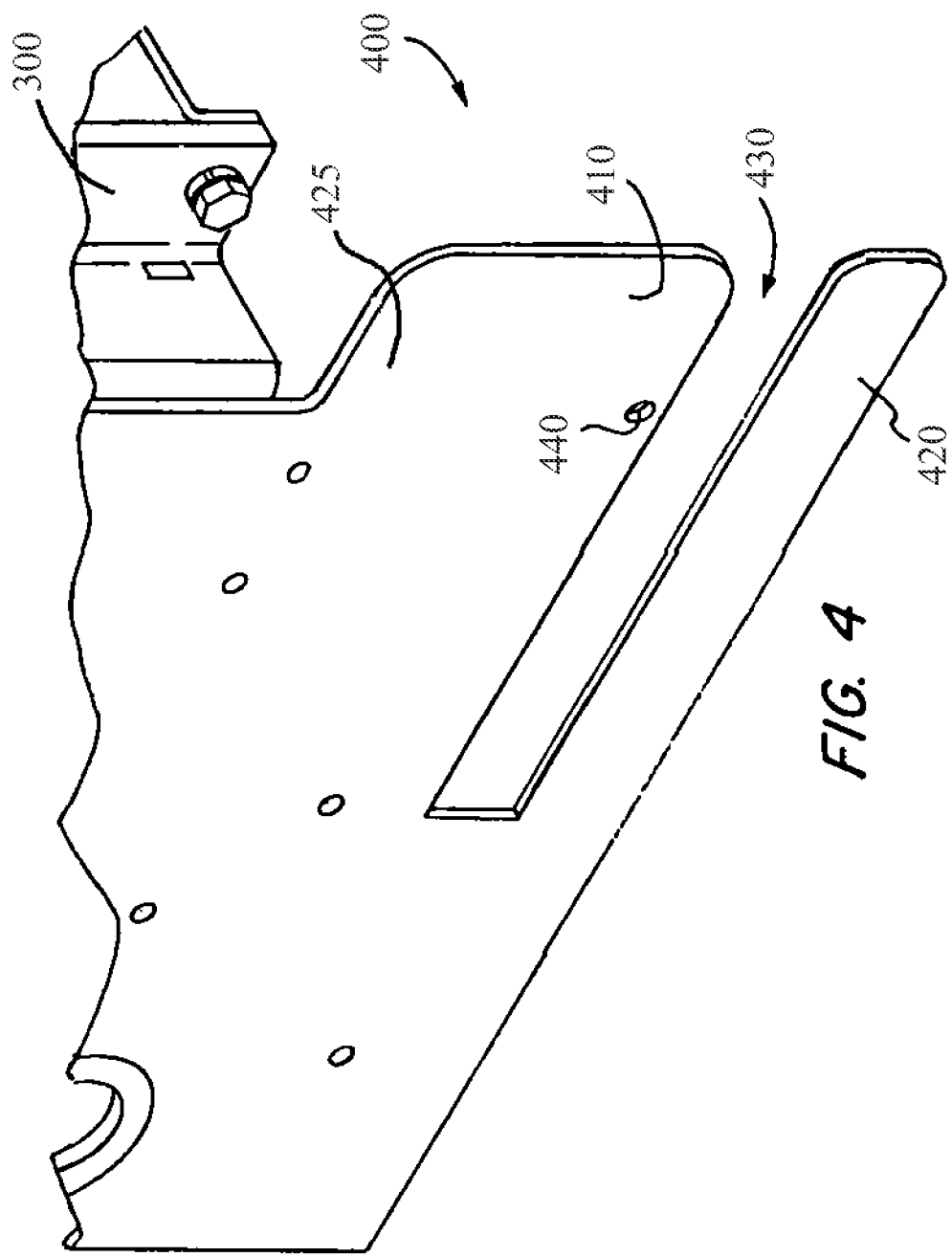
FIG. 4 is a perspective view of the attachment/slot portion of the system module.

FIG. 4 shows the system module 400 having attachment element 410. Attachment element 410 is shown as a panel having lower region 420 where the space between the upper region 425 of attachment element 410 and lower region 420 forms slot 430. Manifold system 100 may slide into the slot formed by attachment element 410 (shown in FIG. 5). This is because the grooves on manifold system 100 have a width which corresponds to the width of attachment element 410 and 420 of system module 400.

Additionally, system module 400 includes mounting hole 440, allowing for screws (not shown) to secure manifold system 100 to system module 400. While only one mounting hole is shown, various mounting holes may be present within system module 400, corresponding to various mounting holes in manifold system 100. FIG. 4 also shows the system module 400 being attached to a trailer vehicle 300, such that the manifold system is able to be repaired during use of the use of the trailer vehicle.

Figure 5:
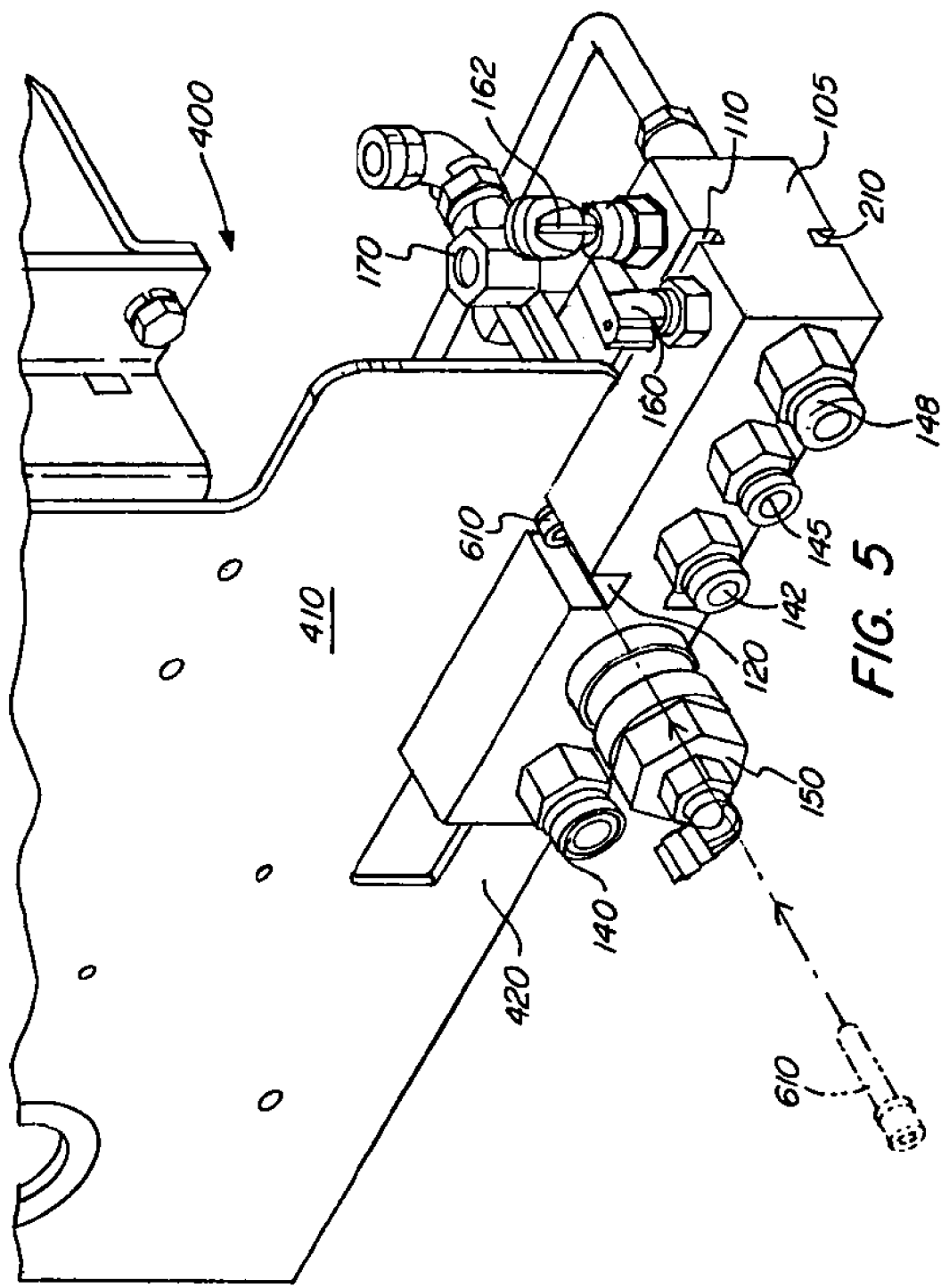
FIG. 5 is a perspective view of the manifold system being adaptable to the attachment/slot portion of the system module shown in FIG. 4.

FIG. 5 shows manifold system 100 secured into system module 400 through attachment element 410 by fastener 610. Additionally, in FIG. 5, groove 110 and lower groove 210 are shown interacting with attachment element 410 and lower attachment element 420. These grooves correspond to attachment element 410 and 420, allowing for body 105 of manifold system 100 to be supported, and allowing for manifold system 100 to slide into slot 430 formed by attachment element 410 and 420. Furthermore, screw 610, shown in phantom and in a fastening position, is able to secure body 105 of manifold system 100 to attachment element 410 and to system module 400. While shown as a screw, fastener 610 may be any other such fastening means known in the art.

The ability of manifold system 100 to be quickly and easily fastened and/or unfastened, and then slid off from attachment element 410, allows manifold system 100 to be easily removed and/or attached to system module 400. This design allows for the various advantages of the manifold system listed above.

Additionally, FIG. 5 shows the various components of manifold system 100 including straight fitting(s) 140, 142, 145 and 148, one way check valve 150, 90 Degree fitting(s) 160 and 162, pressure protection valve 170.

Figure 6:
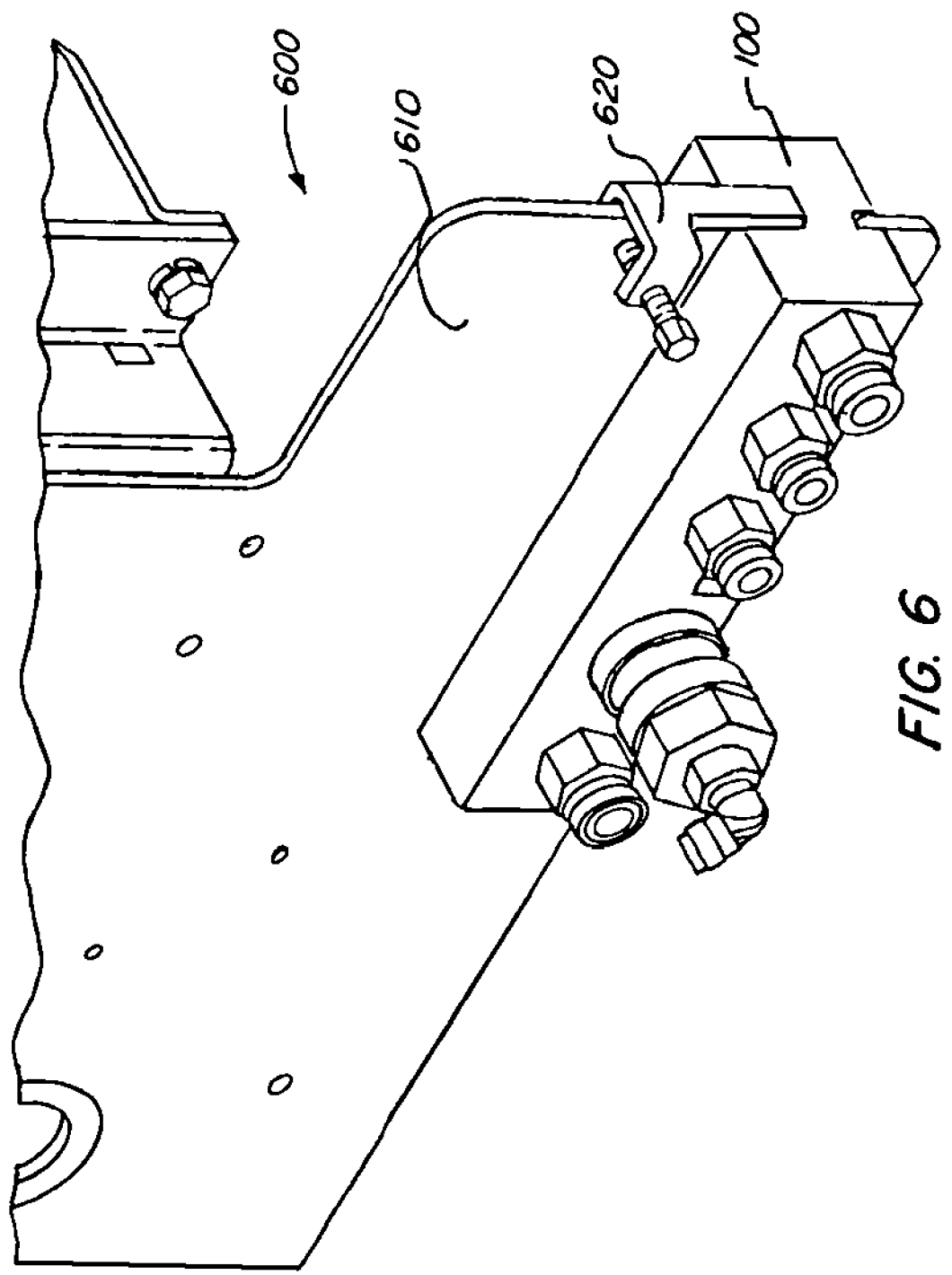
FIG. 6 is an alternative perspective view of the manifold system being adaptable to the attachment/slot portion of the system module having a fastening orientation from the one disclosed in FIG. 5.

FIG. 6 shows another embodiment of the invention where manifold system 100 is attached to system module 600 having attachment element 610, where manifold system 100 fits into attachment element 610. Here, fastening element 620 is shown as a clamp, allowing for manifold system 100 to be clamped to system module 600.

In other embodiments of the invention, a combination of a clamp, clamping means, and/or fasteners may be used to secure manifold system 100 to attachment element 410 of system module 400.

In other embodiments not shown in the figures, additional fasteners and/or grooves may be used to secure the manifold system to the attachment element on the system module panel.

The embodiments of the invention allow for a manifold system to be quickly replaced by another manifold system allowing for continued use of the trailer/dolly vehicle. The invention further allows for a reduction in installation time of the manifold system, and helps eliminate installation error of the manifold system, thus minimizing operation cost in both early and unnecessary repair and replacement cost, as well as minimizing catastrophic failures resulting in insurance cost saving.

The manifold system also provides increased ease of use, durability, and longevity, as it attaches to the panel on the system module of the trailer/dolly.

The manifold system may be made of aluminum, casting, engineering plastics, and various other materials known in the art.

Additionally, the manifold system may be fastened such that its longitudinal axis is completely surrounded by the attachment element as shown in FIG. 6 or partially surrounded by the attachment element as shown in FIG. 5.

While the invention has been specifically described in connection with certain specific embodiments thereof, it is to be understood that this is by way of illustration and not of limitation and that various changes and modifications in form and details can be made thereto, and the scope of the appended Claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A module, the module comprising:
a panel fixed to an exterior surface of a trailer/dolly vehicle, said panel having a slot including a first region and second region;
a manifold that slideably engages into the slot having at least two connection fittings on an exterior of said manifold and at least one internal passage way fluidly connecting said at least two connection fittings for detachably connecting valves, said manifold having a length greater than a width and a height of said manifold and at least one groove extending along the entire length of said manifold for engagement with the slot, said manifold mounted between the first region and the second region of the slot of said panel; and
at least one fastening element,
wherein upon slideable engagement of the manifold into the slot, at least one of the first and second regions of the slot engages into the at least one groove along the length of said manifold and the at least one fastening element detachably fastens said manifold to said panel; and
wherein said manifold further includes at least one valve remotely located from said manifold coupled to one of said at least two connection fittings.

2. The module of claim 1, wherein the manifold is fabricated from a group of materials consisting of: aluminum, casting, engineering plastics, metal, steel, or a combination thereof.

3. The module of claim 1, wherein the at least one groove comprises two grooves, the two grooves engaging with corresponding edges on the second region and the first region of the slot.

4. The module of claim 1, further comprising a pressure protection valve attached to the manifold and a boot enclosing the pressure protection valve so as to protect the manifold from contamination.

5. The module of claim 1, wherein the first region extends parallel to the second region.

6. The module of claim 1, wherein the at least one fastening element fastens the manifold to the second region by passing through at least one mounting hole in the manifold and at least one mounting hole in the second region.

7. The module of claim 1 wherein said at least one valve is selected from the group consisting of: a check valve and a pressure protection valve.

8. The module of claim 1 wherein one of said at least two fittings is selected from the group consisting of: a straight fitting and a ninety-degree fitting.

* * * * *